United States Patent [19]

Goodman et al.

[11] Patent Number: 5,420,404
[45] Date of Patent: May 30, 1995

[54] APPARATUS AND CONTINUOUS PROCESS FOR DRYING OF DIELECTRIC MATERIALS

[75] Inventors: Wendell G. Goodman, Nashville, Tenn.; Alex Vulpe, Waxahachie, Tex.

[73] Assignee: W. G. Goodman and Associates, Inc., Nashville, Tenn.

[21] Appl. No.: 294,733

[22] Filed: Aug. 23, 1994

[51] Int. Cl.$^6$ .......................... H05B 6/60; H05B 6/50
[52] U.S. Cl. .................... 219/775; 219/772; 219/779; 219/780; 264/26; 425/174.8 E; 34/250
[58] Field of Search ............... 219/775, 774, 772, 778, 219/779, 780, 690, 693, 695; 264/26; 425/174.8 R, 174.8 E; 34/250, 251, 265

[56] References Cited

U.S. PATENT DOCUMENTS

| | | | |
|---|---|---|---|
| 2,436,999 | 3/1948 | McMillan et al. | 264/26 |
| 2,483,623 | 10/1949 | Clayton | 219/772 |
| 2,504,969 | 4/1950 | Ellsworth | 219/777 |
| 3,041,435 | 6/1962 | Cameron | 219/775 |
| 3,125,656 | 3/1964 | Spash et al. | 219/778 |
| 3,721,920 | 3/1973 | Mann | 331/168 |
| 3,971,693 | 7/1976 | Pederson | 156/273 |
| 4,104,804 | 8/1978 | Sargeant | 34/1 |
| 4,147,488 | 4/1979 | Chiron | 425/174.8 E |
| 4,254,253 | 3/1981 | Brent, Jr. et al. | 528/272 |
| 4,392,804 | 7/1983 | Pushee et al. | 425/174.8 E |
| 4,396,816 | 8/1983 | Krishnakumar et al. | 219/10.43 |
| 4,531,038 | 7/1985 | Lillibridge et al. | 219/10.81 |
| 4,546,226 | 10/1985 | Trembley et al. | 219/10.81 |
| 4,567,340 | 1/1986 | Latchum, Jr. | 219/10.41 |
| 4,629,851 | 12/1986 | Holle | 219/10.81 |
| 4,792,573 | 12/1988 | Cohn | 521/604 |
| 5,145,694 | 9/1992 | Brams | 425/174.8 R |
| 5,250,773 | 10/1993 | Lind et al. | 219/690 |
| 5,266,762 | 11/1993 | Hoffman et al. | 219/778 |

OTHER PUBLICATIONS

George R. Lightsey & Lynn D. Russell, Mississippi State Univ., *Low Temperature Processing of Plastics Utilizing Microwave Heating Techniques (1985)*.

John D. Gaspari, *Microwave/RF Resin Drying: More Than Hot Air?*, Plastics Technology 66–73 (Oct. 1989).

Primary Examiner—Philip H. Leung
Attorney, Agent, or Firm—Walker, McKenzie & Walker

[57] ABSTRACT

An apparatus and method for drying, by heating, a continuous supply of dielectric material. A terminated, quarter-wavelength transmission line is used as a "traveling wave" applicator for transferring electromagnetic energy from a radio-frequency generator to the dielectric material as the material passes through the transmission line, preferably by gravity feed. The transmission line applicator is directly connected to the output of the radio-frequency generator, without any intervening feeding transmission line, so that the transmission line applicator becomes the resonant output tank circuit of the generator and thus determines the oscillation frequency of the generator. Forced air may be blown through the dielectric material as it flows through the transmission line so as to sweep moisture, driven to the surface of the dielectric material by heating, from the flowing dielectric material. The temperature of the flowing dielectric material may be monitored, and control circuitry accordingly adjusts the power output of the radio-frequency generator so as to maintain the temperature within a desired range. The flow of the dielectric material from the transmission line applicator may be metered so as to achieve a required residence time of the dielectric material within the transmission line for proper drying.

17 Claims, 2 Drawing Sheets

APPARATUS AND CONTINUOUS PROCESS FOR DRYING OF DIELECTRIC MATERIALS

BACKGROUND OF THE INVENTION

1. Field of the Invention

The present invention relates, in general, to dielectric heating, and in particular, to the use of radio-frequency power to dry dielectric materials in a continuous process by heating the dielectric materials.

2. Description of Related Art

Hygroscopic plastic resins must be voided of moisture before they can be melted and processed into finished products, as by injection molding machines, extruders, and other well-known means. Moisture, if allowed to remain within the resins, would result in a degradation of physical and visual properties of the resulting end products that are formed from the processed resins.

The conventional method of drying hygroscopic resins is by placing the resin material, usually in pellet form, into a hopper and then passing dry, heated air through the bed of resin. The air heats and dries the resin, but only after an extended processing period typically lasting from two to eight hours, depending on the particular resin material and the amount of initial moisture that must be removed. The resin material typically flows through the hopper at a rate dependent upon the consumption of the downstream injection molding machine or extruder, and the hopper is sized, in a manner well-known to those skilled in the art, so as to provide the necessary residence time of the resin in the hopper to achieve the desired moisture removal.

It is well-known that the use of dielectric heating, such as by microwaves or other radio-frequency energy, will greatly enhance the drying of resins and reduce the required drying time by a factor of five to ten times. Several Japanese companies have developed and marketed expensive microwave dryers, but these prior art microwave dryers only operate in batch or semi-batch modes, making such dryers unsuitable for continuous processes. It is therefore desirable to have a practical apparatus and continuous process that provides the necessary residence times for moisture removal drying together with uniform and controlled dielectric heating to accomplish the drying.

Heretofore, radio-frequency transmission lines have been used in dielectric heating apparatus to transfer electromagnetic energy from a generator source to an applicator load that, in turn, heats dielectric material placed within an electromagnetic field created within the applicator. It is well-known to model such a transmission line as distributed capacitance, inductance and resistance, and an electromagnetic field will be created along the transmission line that will transfer energy from the generator source to the applicator load most efficiently when the transmission line has certain proper characteristics. Some important characteristics to be considered are the impedance of the generator source, the terminating impedance of the applicator load, the length of the transmission line, and the characteristic impedance ("Z") of the transmission line. The characteristic impedance of a transmission line is a function of the distributed capacitance and inductance per unit length of the line, and is generally also a function of the oscillation frequency of the electromagnetic energy traveling down the transmission line.

For a transmission line whose length is equal to a quarter-wavelength (i.e., $\lambda/4$) of the electromagnetic energy traveling down the transmission line, transmission line theory teaches that, when such a line is terminated by either a short circuit or an open circuit, the electrical characteristics of such a transmission line are the same as that of a resonant parallel inductor-capacitor circuit. Such a resonant parallel circuit is often used as a "tank" circuit driven by an electromagnetic generator source to determine the oscillation frequency of the generator source.

The use of such transmission lines by the prior art to transfer electromagnetic energy from a generator source to an applicator load has several disadvantages. First, electromagnetic power is lost in the transference of electromagnetic energy down the feeding transmission line because such transmission lines are not lossless, thereby causing prior art devices to be inefficient. Second, as different materials, each having differing dielectric constants, are placed into the applicator load, heretofore known heating apparatus require re-adjustment of various circuit elements, so as to accommodate the changes in load impedance, in order to maintain efficient power transfer from the generator source to the applicator load. Third, conventional applicator heating apparatus are known to require multiple feed points of radio-frequency energy when the path of the heated dielectric material through the applicator becomes long.

It is therefore desirable to have an apparatus and method for efficiently transferring electromagnetic power from a generator source into heated dielectric materials without the power losses heretofore seen in transmission lines connecting the generator source to its applicator load. It is further desirable to provide an apparatus and method for heating dielectric materials such that no re-adjustment of circuit elements is required as the dielectric constant of the dielectric materials changes. Finally, it is still further desirable to provide an apparatus and method for heating dielectric materials that allow the use of a much longer applicator length, for a given oscillation frequency, than heretofore possible without requiring multiple feed points of radio-frequency energy.

SUMMARY OF THE INVENTION

The present invention is an apparatus and method for drying, by heating, a continuous supply of dielectric material. A terminated, quarter-wavelength transmission line is used as a "traveling wave" applicator means for transferring electromagnetic energy from a radio-frequency generator to the dielectric material as the material passes through the transmission line, preferably by gravity feed. The transmission line applicator is directly connected to the output of the radio-frequency generator, without any intervening feeding transmission line, so that the transmission line applicator becomes the resonant output tank circuit of the generator and thus determines the oscillation frequency of the generator. Forced air may be blown through the dielectric material as it flows through the transmission line so as to sweep moisture, driven to the surface of the dielectric material by heating, from the flowing dielectric material. The temperature of the flowing dielectric material may be monitored, and control circuitry accordingly adjusts the power output of the radio-frequency generator so as to maintain the temperature within a desired range. The flow of the dielectric material from the transmission line applicator may be metered so as to achieve a required residence time of the dielectric material within the transmission line for proper drying.

It is an object of the present invention to allow the efficient transfer of electromagnetic power from a generator source into heated dielectric materials without substantial power loss, and to provide controlled and uniform heating of the dielectric materials. It is a further object to provide an apparatus and method for heating dielectric materials without requiring re-adjustment of circuit elements as the dielectric constant of the dielectric materials changes. Finally, it is still another object of the present invention to provide an apparatus and method for heating dielectric materials using a much longer applicator length, for a given oscillation frequency, than heretofore possible with only a single feed point of radio-frequency energy.

DESCRIPTION OF THE PREFERRED EMBODIMENT

Figure 2:
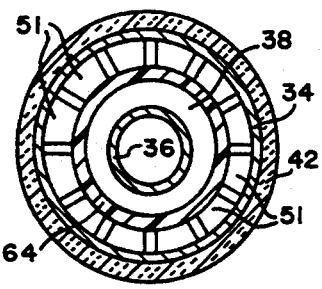
FIG. 2 is a transverse sectional view of the present invention showing the termination plate of the transmission line, taken substantially along the line 2—2 shown in FIG. 1.
Figure 6:
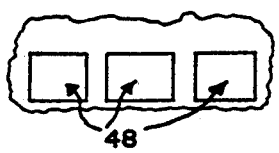
FIG. 6 is a partial view showing the material feed ports into the transmission line, taken substantially along the line 6—6 shown in FIG. 5.

Referring to FIGS. 1–6, apparatus 20 for heating a continuous supply of dielectric materials is seen to comprise radio-frequency generating means 22, well-known to those skilled in the art, for supplying a source of electromagnetic 22 power at a generator output 24, and applicator means 26 for transferring the electromagnetic power to the continuous supply of dielectric materials as the continuous supply of dielectric materials passes, preferably as by gravity feed, through applicator means 26 in a continuous flow thereinto and therefrom, thereby causing the continuous supply of dielectric materials to become heated. The electromagnetic power has a wavelength λ.

Applicator means 26 comprises a terminated transmission line 28 having a driven end 30 and a terminated end 32, and transmission line 28 has a length, from driven end 30 to terminated end 32, that is a quarter wavelength multiple of the wavelength λ, i.e., that is some integral multiple of λ/4, and preferably the length of transmission line 28 is equal to a single quarter wavelength and not a greater multiple thereof.

Transmission line 28 comprises a ground electrode 34 extending substantially from driven end 30 to terminated end 32, with ground electrode 34 being held at a constant electrical potential (and preferably held at ground potential as by wires, electromechanical contacts, or other means well-known to those skilled in the art) relative to generator output 24.

Transmission line 28 further comprises a driven electrode 36 extending substantially from driven end 30 to terminated end 32 and spaced an interelectrode distance from ground electrode 34. Driven electrode 36 is shorted to ground electrode 34 at terminated end 32 as by an electrically-conductive ground plane termination plate 38, thereby causing driven electrode 36 to be held at the same constant electrical potential at terminated end 32 as ground electrode 34. Driven electrode 36 is directly coupled at a feed point 40, remote from terminated end 32, to generator output 24 so that transmission line 28 is a resonant output tank circuit of generating means 22. When used to dry hygroscopic resins, the length of transmission line 28 is chosen to achieve the desired oscillation frequency of generating means 22.

The phrase "directly coupled", as used herein to describe the connection of driven electrode 36 to generator output 24, shall be understood to mean that no intervening feeding transmission line is used to transfer the electrical power from generator output 24 to applicator means 26. This direct coupling of transmission line 28 to generator output 24 is an essential distinguishing feature of the present invention from the prior art, and causes transmission line 28 to become an integral part of the output circuit of generating means 22, serving as the resonant circuit element for generating means 22 to thereby determine its oscillation frequency. In this manner, as the dielectric constant of the heated dielectric material changes, the oscillation frequency of generating means 22 is caused to also change without any manual circuit adjustments, thereby maintaining efficient power transfer from generating means 22 to the heated dielectric material. Additionally, the elimination of any intervening feeding transmission line eliminates the power losses heretofore seen in such feeding transmission lines.

Preferably, driven electrode 36 and ground electrode 34 are each coaxially concentric cylinders as shown, thereby eliminating, by axial symmetry, any discontinuities or fringe effects that might otherwise be present in the electromagnetic field that is created between these two electrodes. A layer of thermal insulation 42 surrounds ground electrode 34.

Dielectric materials, such as, for instance, hygroscopic plastic resin pellets P, flow as by gravity from a hopper 44, around a sealed enclosure 46 that surrounds the electronic components of generating means 22, through material feed ports 48 through ground wall extension 150 of ground electrode 34 and into transmission line 28, downwardly between ground electrode 34 and driven electrode 36, through egress ports 151 through termination plate 38, and then into a funnel-shaped collection chamber 152. A supply apparatus, not shown but well-known to those skilled in the art, keeps hopper 44 filled with plastic resin. If desired, material feed ports 48 could, rather than being through ground wall extension 150, be through a transverse insulating plate, not shown but similar in construction to termination plate 38 and placed across driven end 30 of transmission line 28.

The flow of the plastic resin from applicator means 26 is regulated by output metering means 54 such as, for example, a well-known screw auger 56 driven by a motor 58 to control delivery of the heated resin to a downstream receiver, not shown, such as, for example, an injection molding machine or extruder. In many applications, the consumption rate of the downstream receiver can control the flow rate of the plastic resin through applicator means 26.

While hygroscopic plastic resins are used herein as an example of dielectric material that may be dried by heating for purposes of illustration, the present invention shall be understood to be applicable to heating and/or drying other dielectric materials as well, in a manner that will become apparent to those skilled in the art after the disclosure of this invention.

Preferably interposed between ground electrode 34 and driven electrode 36 is a cylindrical constraining wall 60 coaxially concentric with ground electrode 34 and driven electrode 36 so as to define an annulus region 62, remote from driven electrode 36, between ground electrode 34 and constraining wall 60, with annulus region 62 extending substantially from driven end 30 to terminated end 32 of transmission line 28. Constraining wall 60 is electrically isolated from ground electrode 34 and driven electrode 36 so as to be at an unconstrained and floating potential, and plastic resins P are thus constrained by constraining wall 60 to pass through applicator means 26 within annulus region 62. Constraining wall 60 is preferably made of aluminum and is supported from and isolated from ground electrode 34 and driven electrode 36 by an insulating ring 64 made of synthetic resin polymer, such as that sold under the trademark TEFLON, and an insulating ring 66 made of G-7 insulating material, but constraining wall 60 could also be made out of any other non-magnetic metal or suitable dielectric material providing that such suitable dielectric material chosen for constraining wall 60 could withstand the drying temperatures created within applicator means 26 and also was not receptive to radio-frequency energy.

While constraining wall 60 could be eliminated so that annulus region 62 extends from ground electrode 34 all the way to driven electrode 36, it has been found that the electromagnetic field strength at the surface of driven electrode 36 is too high and causes non-uniform heating across annulus region 62 if constraining wall 60 is absent.

While the distance between constraining wall 60 and ground electrode 34 is preferably two inches (5 cm.), this dimension may be varied to provide different residence times of the flowing plastic resin within the electromagnetic field of transmission line 28. For a constant metering rate of heated dielectric flowing from applicator means 26, increasing the width of the annulus region will increase the residence time because the volume of resin within the annulus region will increase. The minimum gap for annulus region 62 must be no smaller than that which still allows the plastic resin to flow there through. The annulus region width must not be so great that the attenuation of electromagnetic energy across the annulus region through the bed of plastic resin is substantial enough to cause a substantial temperature variation transversely across the annulus region in the plastic resin. While the attenuation of the electromagnetic energy across the annulus region, and consequent transverse temperature variation of the flowing resin, is dependent on the particular dielectric material being heated, the maximum practical width of the annulus region is about six inches (15.2 cm.).

Similarly, the circumference of the annulus region can be varied as well, with a larger circumference producing longer residence times, for a constant annulus width and metering rate, because of the increased volume of resin within the electromagnetic field of the applicator means.

The length of transmission line 28 may be varied as well to alter residence times, but, as previously indicated, changing the length of the transmission line will vary the oscillation frequency of generating means 22. The optimum frequency range has been found to be between 50 and 100 MHz, corresponding to a preferred applicator length of approximately 25 to 50 inches (63.5 to 127 cm.), but transmission line 28 could possibly have a length ranging between 10 and 200 inches (25.4 to 508 cm.).

The construction of the radio-frequency portion of apparatus 20, i.e., applicator means 26, may be of any non-magnetic material that is electrically conductive or that has a conductive surface.

Figure 3:
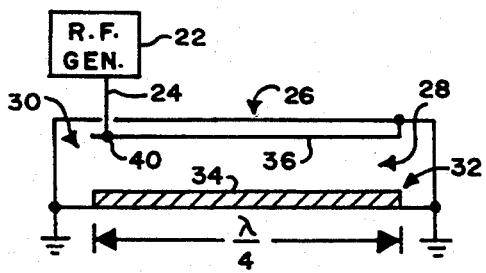
FIG. 3 is a schematic diagram of the transmission line of the present invention.
Figure 4:
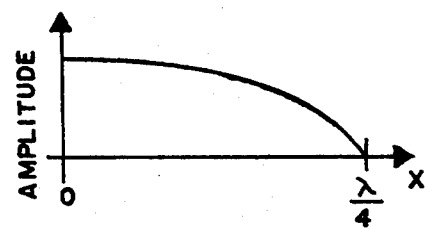
FIG. 4 is a graph showing the field amplitude versus position along the transmission line for the schematic of FIG. 3.

Referring to FIGS. 3 and 4, the configuration of transmission line 28 can now be explained. With transmission line 28 terminated in a short circuit at terminated end 32 and having a length that is one-quarter wavelength of the applied electromagnetic energy, the amplitude (heating strength) of the electromagnetic field along transmission line 28 will have a longitudinal field amplitude profile as shown in FIG. 4, having a maximum value at driven end 30 and sinusoidally tapering to zero at terminated end 32. With such an amplitude profile, the resin entering driven end 30 of transmission line 28 will be rapidly heated upon entry, and then the field strength will taper down to zero to prevent overheating of the resin during its residence time within applicator means 26 before its exit therefrom. Continued exposure to the radio-frequency field is important to provide rapid drying of the resin, and the tapered amplitude profile is also important to prevent overheating of the resin.

Figure 5:
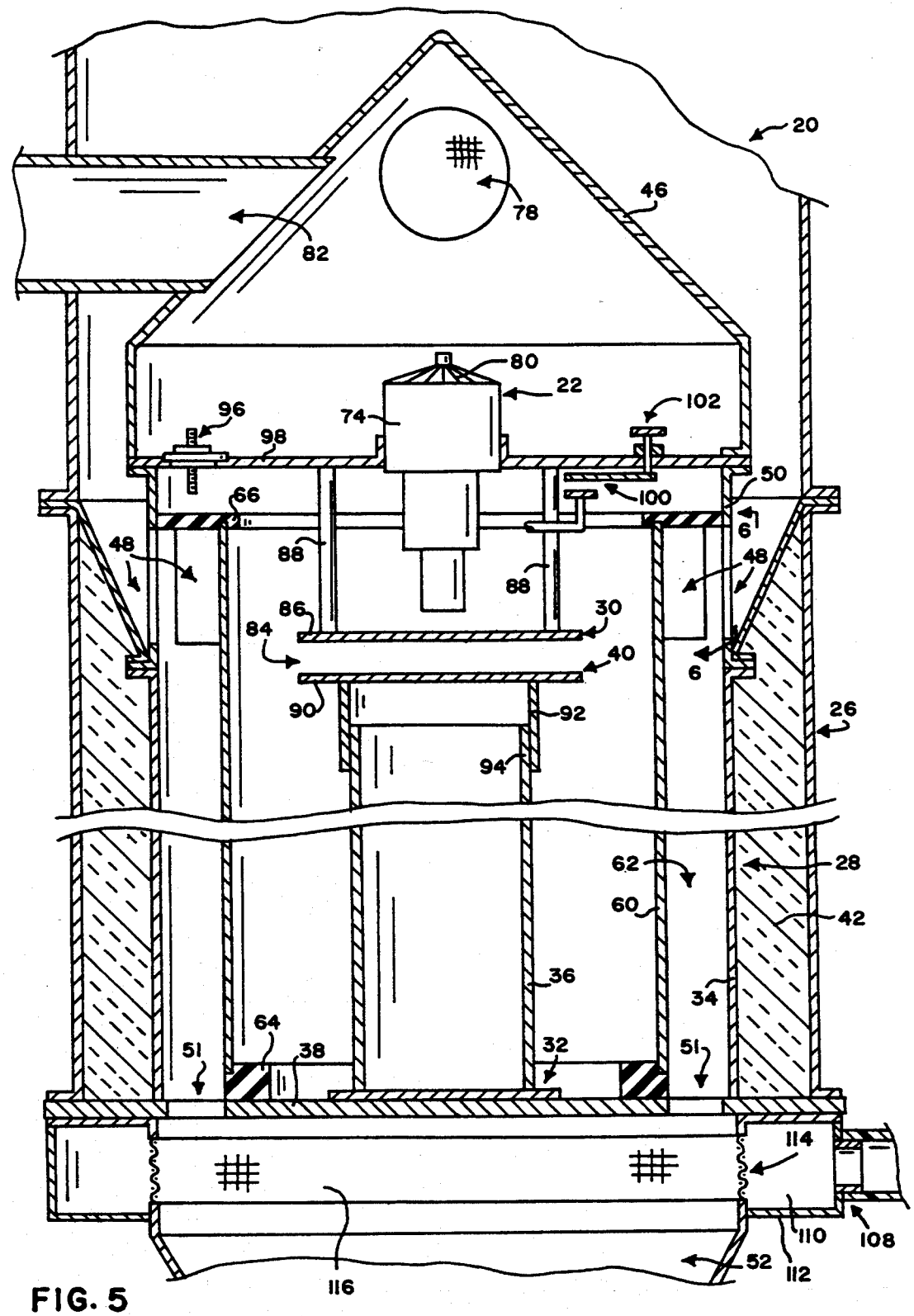
FIG. 5 is a longitudinal sectional view of a portion of the present invention, taken substantially along a diameter of the transmission line, with some parts omitted for clarity.

If, for some reason, it were desired to create a radio-frequency field having a zero-amplitude value at the entrance of the resin into the transmission line and having a maximum amplitude value at the exit, the structure shown in FIG. 5 would simply need to be inverted, and the resin would then enter terminated end 32 of transmission line 28 and exit at driven end 30, in a manner that will now be understood.

It has been predictably found that when polymer resins in particulate form, having a natural or induced dissipation power factor between 0.001 and 0.030 at 1 MHz, are subjected to radio frequency energy, molecular excitation occurs.

When the molecules are exposed to an electrostatic field, they rotate back and forth at the same rate as the operating frequency of the source of radio frequency energy. Each molecule, depending on its individual size, shape, mass, and electrical structure, responds in varying degrees to the rapidly reversing field by rotating to align with the instantaneous field.

The radio-frequency energy absorbed by the molecule is translated into rotational kinetic energy of the entire molecule, resulting in a temperature rise. Water molecules are particularly receptive to the radio-frequency energy, and tend to selectively absorb it. The water molecules within the structure of a resin pellet are forced to the surface of the pellet due to the heating of the resin, and then, when at the surface, the water molecules are vaporized by the radio-frequency energy. Air is then used to sweep the free moisture out of the bed of heated resin. This is the mechanism that causes rapid drying of the resin.

Drying requirements for industrial applications tend to be for resin consumption rates of 30 pounds/hour (13.6 kg./hour) to thousands of pounds/hour, and such industrial applications are typically continuous processes. Moisture contents of "wet" resins range from 0.2% to 0.5% by weight. The moisture content specification to which such resins must be dried depend on the particular resin material and the application, but typically fall within the range of 0.005% to 0.02%. The present invention provides an energy-efficient and rapid method of accomplishing such drying.

Figure 1:
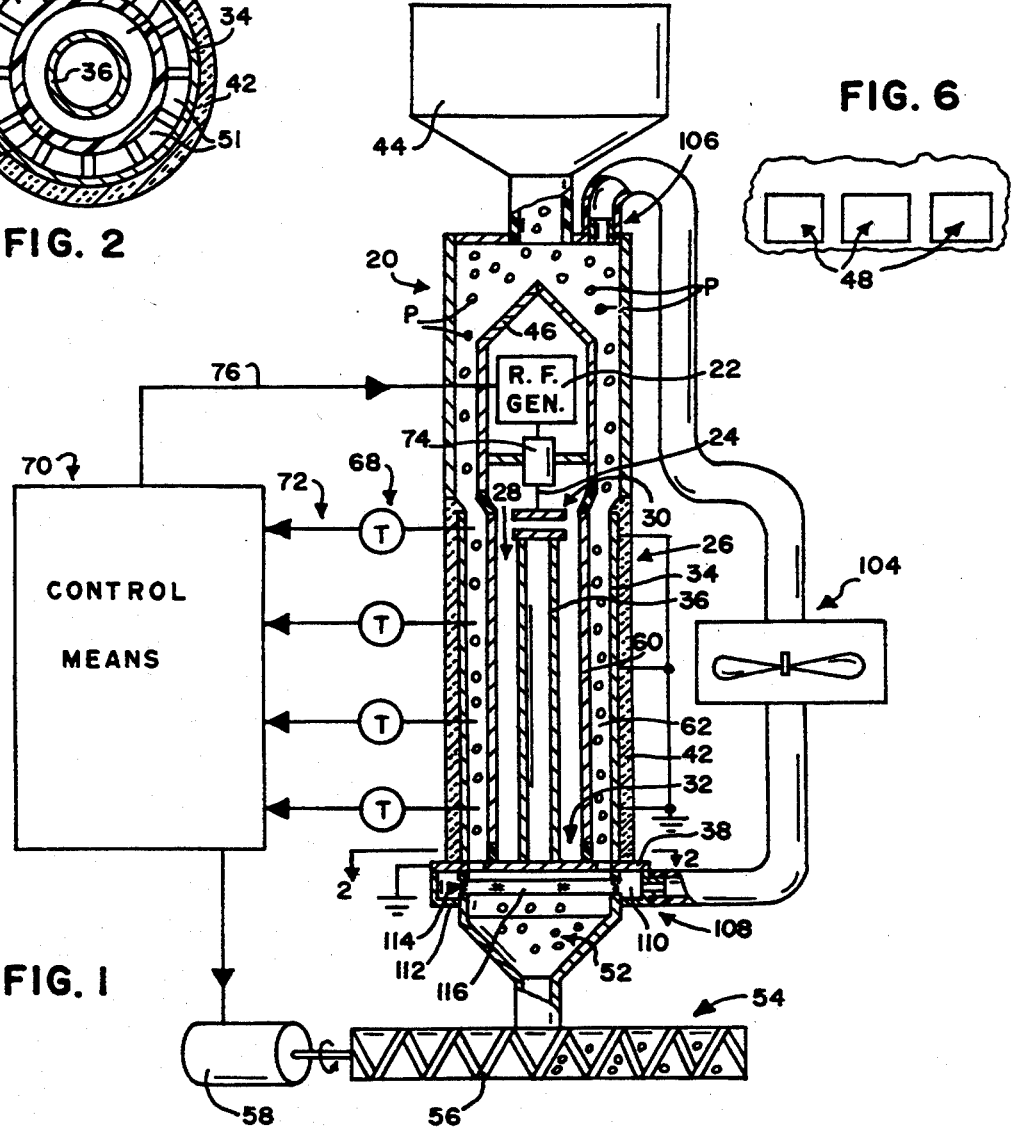
FIG. 1 is a schematic diagram of the present invention showing the various interconnected parts.

Referring to FIG. 1, as the resin pellets flow down annulus region 62, they are heated by the radio-frequency field within that region. While the desired temperature for drying any particular resin is dependent on its specific material properties, the desired and optimal drying temperature range will typically be about some nominal value between 160° F. to 350° F. (71° C. to 177° C.).

To achieve a desired temperature profile of the resin as it passes between ground electrode 34 and driven electrode 36, apparatus 20 further comprises temperature sensing means 68 for measuring the temperature profile, and feedback control means 70, responsive to temperature sensing means 68 and operably connected to generating means 22, for causing generating means 22 to increase or decrease its supplied electromagnetic power so that the temperature profile is caused to be substantially within a desired temperature range.

Temperature sensing means 68 may be one of a number of well-known sensors, such as a resistance thermometer or an infrared thermometer, that generate an electrical signal 72 that may be input to feedback control means 70. These sensors extend through ground electrode 34 into the middle of annulus region 62, so as to accurately measure the temperature of the flowing resin.

Feedback control means 70, in turn and as a function of electrical signal 72, using well-known feedback control circuitry, causes generating means 22 to increase or decrease its supplied electromagnetic power by, for example, varying the direct current ("DC") voltage to output power tube 74 of generating means 22 so as to vary the radio-frequency field strength emanating from generator output 24, or by modulatingly pulsing the output of generating means 22 on and off, with this feedback control path schematically represented by reference numeral 76. If desired, feedback control means 70 could alternately or additionally control metering means 54 so as to increase or decrease the flow of resin from applicator means 26 and thereby decrease or increase, respectively, the residence time of the resin within applicator means 26, thereby decreasing or increasing the exposure to and heating by electromagnetic energy of the resin.

Referring now to FIG. 5, the details of generating means 22 and the direct coupling to transmission line 28 can now be explained.

A sealed electronics enclosure 46 houses radio-frequency generating means 22, with generating means 22 having an output power tube 74 for supplying a source of electromagnetic energy at generator output 24. Generating means 22 can be constructed using one of many well-known standard circuits, and the preferred embodiment uses a well-known modified Colpitts oscillator circuit.

Output power tube 74 must, by necessity, be cooled in a manner well-known to those skilled in the art such as by water or air cooling. In the preferred embodiment, filtered ambient air is blown into enclosure 46 through inlet 78 by a well-known fan, not shown, exterior to enclosure 46. The air entering enclosure 46 through inlet 78 is directed down onto the fins 80 of output power tube 74 by a well-known air sock, not shown and removed for clarity, extending from inlet 78 onto output power tube 74. After passing over the fins 80 of output power tube 74, the air then passes up through holes (not shown) in base plate 98 and exits enclosure 46 through an outlet 82.

Output power tube 74 is preferably capacitively coupled to driven electrode 36 using capacitive coupling means 84, with capacitive coupling means 84 comprising a first circular conductive plate 86 mounted on standoff insulators 88 and further comprising a second circular conductive plate 90 electrically connected to driven electrode 36 at feed point 40 and parallel to first conductive plate 86. The inter-plate gap between first and second plates 86 and 90 is typically adjusted to be between one and three inches (2.5 and 7.6 cm). The larger the gap between the two plates, the greater the peak amplitude or field strength at driven end 30 of transmission line 28. This gap may be adjusted by sliding outer telescoping section 92 of driven electrode 36 up and down on inner telescoping section 94 of driven electrode 36, in a manner that will now be apparent.

The distance between first plate 86 and termination plate 38 defines the quarter-wavelength distance for transmission line 28 and thus establishes the operating frequency of generating means 22. The greater this distance, the longer the wavelength and the lower the operating frequency.

It should be understood that many well-known circuit elements, such as inductors or capacitors, of generating means 22 are omitted or only partially shown for clarity. Although not shown, it will be understood, as previously discussed in detail, that second plate 90 is directly coupled, as by such omitted inductors and capacitors, to output power tube 74. One such feedthrough capacitor 96 is shown passing through the base plate 98 of generating means 22, and a well-known grid tuning capacitor 100, adjustable by movement of adjustment knob 102, is partially shown. Output power tube 74 is understood to send electrical pulses to transmission line 28 through capacitive coupling means 84, and those pulses then "ring" along transmission line 28 so as to establish the electromagnetic field therewithin which then heats the flowing resin.

Referring to FIG. 1, in order to sweep moisture out of the flowing bed of resin, apparatus 20 further includes forced air means 104 for forcing a stream of air, or equivalently, other gaseous media, through the flowing bed of resin as it passes through applicator means 26. This stream of forced air may either flow co-current with the flowing resin or may flow counter-current through the flowing resin. Because the air does not substantially heat the flowing resin, but only sweeps surface moisture from the heated resin, the requirements for this forced air stream are minimal. The air flow must be at a high enough rate to ensure uniformity of flow through the resin and must be sufficiently conditioned so as not to saturate with moisture as it passes through the resin.

The gaseous media would typically be air but could also be any gas such as nitrogen. The air may either be single-pass ambient air or may be recycled, conditioned air. Forced air means 104 should also be capable of controlling the rate of air flow through applicator means 26. Typical air flow rates are, for example, 0.2 to 0.4 cfm per pound per hour of resin, but some applications may require greater or lesser rates. If the air flow is co-current, the air need not be preheated. If the air flow is chosen to be counter-current, the air should be preferably preheated so as to prevent a significant drop in temperature of the resin emerging from applicator means 26.

Depending on ambient conditions and the direction of the air flow, the air may or may not need to be predried. If the direction of the air flow is co-current, predrying is unnecessary because the air will exit applicator means 26 at the same temperature as the heated resin and will thus not saturate with moisture at typical flow rates. If the air flow is counter-current, the dew point of the entering air preferably should be about 25° F. (14° C.) below the entering resin temperature because the air will preheat the entering resin as the air emerges from the transmission line at the driven end, and, at that point, the temperature of the air will be near the resin temperature.

Apparatus 20 has a first port 106 and a second port 108, and forced air means 104 is understood to force air in one of those two ports and out the other, depending on whether the air flow is co-current or counter-current to the resin flow. Port 106 is in an upper outer corner of apparatus 20 remote from hopper 44 so that the natural annular void space created in the proximity of port 106 as resin flows downwardly from hopper 44 into apparatus 20 prevents resin material from being drawn into port 106 when air flows counter-current to the resin flow. Port 108 is in communication with a chamber 110 formed by a plenum 112 encircling funnel-shaped collection chamber 152, and chamber 110 is in communication with collection chamber 152 through an opening 114 covered by perforated metal or screen 116 so as to prevent the flow of resin into chamber 110 and port 108.

In accordance with the preceding disclosure, the present invention is seen to also include a method for heating a continuous supply of dielectric materials using electromagnetic power from a radio-frequency generator 22 that has a generator output 24. This method will now be understood to comprise the step of passing the continuous supply of dielectric materials through a terminated transmission line 28 in a continuous flow, transmission line 28 having a driven end 30 and a terminated end 32 and transmission line 28 having a length, from driven end 30 to terminated end 32, that is a quarter-wavelength multiple of the wavelength of the electromagnetic power supplied by generator 22, with transmission line 28 comprising a ground electrode 34 extending substantially from driven end 30 to terminated end 32, ground electrode 34 being held at a constant electrical potential relative to generator output 24; and transmission line 28 further comprising a driven electrode 36 extending substantially from driven end 30 to terminated end 232, with driven electrode 36 being spaced an inter-electrode distance from ground electrode 34, with driven electrode 36 being held at said constant electrical potential at terminated end 32 of transmission line 28 and driven electrode 36 being directly coupled at a feed point 40, remote from terminated end 32, to generator output 24 so that transmission line 28 is a resonant output tank circuit of radio-frequency generator 22, and in which said continuous supply of dielectric materials passes between ground electrode 34 and driven electrode 36. The method of the present invention also includes the step of metering the flow of the continuous supply of dielectric materials emerging from transmission line 28. Preferably, transmission line 28 has a length that is a single quarter-wavelength and not a greater multiple thereof.

The method of the present invention may additionally comprise the step of forcing air through the continuous supply of dielectric materials as they pass through transmission line 28.

Additionally, the continuous supply of dielectric materials has a temperature profile as it passes through transmission line 28 between ground electrode 34 and driven electrode 36, and the method of the present invention may further comprise the steps of measuring the temperature profile and causing radio-frequency generator 22 to increase or decrease the electromagnetic power supplied therefrom so that the temperature profile is caused to be substantially within a desired temperature range.

Still further, ground electrode 34 and driven electrode 36 may be concentric, and the method of the present invention may additionally comprise the step of constraining the continuous supply of dielectric materials passing through transmission line 28 between ground electrode 34 and driven electrode 36 to be within an annulus region 62 remote from driven electrode 36.

Although the present invention has been described and illustrated with respect to a preferred embodiment and a preferred use therefor, it is not to be so limited since modifications and changes can be made therein which are within the full intended scope of the invention.

We claim:

1. An apparatus for heating a continuous supply of dielectric materials, said apparatus comprising:

a) radio-frequency generating means for supplying a source of electromagnetic power at a generator output, said electromagnetic power having a wavelength; and b) applicator means for transferring said electromagnetic power to said continuous supply of dielectric materials as said continuous supply of dielectric materials passes through said applicator means in a continuous flow thereinto and therefrom, thereby causing said continuous supply of dielectric materials to become heated, said applicator means comprising a terminated transmission line having a driven end and a terminated end and said transmission line having a length, from said driven end to said terminated end, that is a quarter-wavelength multiple of said wavelength of said electromagnetic power, said transmission line comprising:

i. a ground electrode extending substantially from said driven end to said terminated end, said ground electrode being held at a constant electrical potential relative to said generator output; and ii. a driven electrode extending substantially from said driven end to said terminated end, said driven electrode being spaced an inter-electrode distance from said ground electrode, said driven electrode being held at said constant electrical potential at said terminated end of said transmission line and said driven electrode being directly coupled at a feed point, remote from said terminated end, to said generator output so that said transmission line is a resonant output tank circuit of said generating means, in which said continuous supply of dielectric materials passes through said applicator means between said ground electrode and said driven electrode.

2. The apparatus as recited in claim 1 in which said apparatus further comprises applicator output metering means for metering said flow of said continuous supply of dielectric materials from said applicator means.

3. The apparatus as recited in claim 1, in which said apparatus further comprises forced air means for forcing a stream of air through said continuous supply of dielectric materials as said continuous supply of dielectric materials passes through said applicator means.

4. The apparatus as recited in claim 1, in which said continuous supply of dielectric materials has a temperature profile between said ground electrode and said driven electrode, and said apparatus further comprises:
 a) temperature sensing means for measuring said temperature profile; and
 b) feedback control means, responsive to said temperature sensing means and operably connected to said radio-frequency generating means, for causing said radio-frequency generating means to increase or decrease said electromagnetic power supplied therefrom so that said temperature profile is caused to be substantially within a desired temperature range.

5. The apparatus as recited in claim 1, in which said ground electrode and said driven electrode are concentric, and said transmission line further comprises a constraining wall interposed between said ground electrode and said driven electrode and concentric therewith so as to define an annulus region, remote from said driven electrode, between said ground electrode and said constraining wall, said constraining wall extending substantially from said driven end to said terminated end of said transmission line and being electrically insulated from said ground electrode and said driven electrode, with said continuous supply of dielectric materials being constrained by said constraining wall to pass through said applicator means within said annulus region.

6. An apparatus for heating a continuous supply of dielectric materials, said apparatus comprising:
 a) radio-frequency generating means for supplying a source of electromagnetic power at a generator output, said electromagnetic power having a wavelength;
 b) applicator means for transferring said electromagnetic power to said continuous supply of dielectric materials as said continuous supply of dielectric materials passes through said applicator means in a continuous flow thereinto and therefrom, thereby causing said continuous supply of dielectric materials to become heated, said applicator means comprising a terminated transmission line having a driven end and a terminated end and said transmission line having a length, from said driven end to said terminated end, that is a quarter-wavelength of said wavelength of said electromagnetic power, said transmission line comprising:
  i. a ground electrode extending substantially from said driven end to said terminated end, said ground electrode being held at a constant electrical potential relative to said generator output; and
  ii. a driven electrode extending substantially from said driven end to said terminated end, said ground electrode and said driven electrode being concentric, said driven electrode being spaced an inter-electrode distance from said ground electrode, said driven electrode being held at said constant electrical potential at said terminated end of said transmission line and said driven electrode being directly coupled at a feed point, remote from said terminated end, to said generator output so that said transmission line is a resonant output tank circuit of said generating means; and
 c) a constraining wall interposed between said ground electrode and said driven electrode and concentric therewith so as to define an annulus region, remote from said driven electrode, between said ground electrode and said constraining wall, said constraining wall extending substantially from said driven end to said terminated end of said transmission line and being electrically insulated from said ground electrode and said driven electrode, said continuous supply of dielectric materials being constrained by said constraining wall to pass through said applicator means within said annulus region.

7. The apparatus as recited in claim 6, in which said continuous supply of dielectric materials has a temperature profile within said annulus region, and said apparatus further comprises:
 a) temperature sensing means for measuring said temperature profile; and
 b) feedback control means, responsive to said temperature sensing means and operably connected to said radio-frequency generating means, for causing said radio-frequency generating means to increase or decrease said electromagnetic power supplied therefrom so that said temperature profile is caused to be substantially within a desired temperature range.

8. The apparatus as recited in claim 7, in which said apparatus further comprises forced air means for forcing a stream of air through said continuous supply of dielectric materials as said continuous supply of dielectric materials passes through said applicator means.

9. The apparatus as recited in claim 8 in which said apparatus further comprises applicator output metering means for metering said flow of said continuous supply of dielectric materials from said applicator means.

10. A method for heating a continuous supply of dielectric materials using electromagnetic power from a radio-frequency generator, said radio-frequency generator having a generator output, said method comprising the steps of:
 a) passing said continuous supply of dielectric materials through a terminated transmission line in a continuous flow, said transmission line having a driven end and a terminated end and said transmission line having a length, from said driven end to said terminated end, that is a quarter-wavelength multiple of said wavelength of said electromagnetic power, said transmission line comprising:
  i. a ground electrode extending substantially from said driven end to said terminated end, said ground electrode being held at a constant electrical potential relative to said generator output; and
  ii. a driven electrode extending substantially from said driven end to said terminated end, said driven electrode being spaced an inter-electrode distance from said ground electrode, said driven electrode being held at said constant electrical potential at said terminated end of said transmission line and said driven electrode being directly coupled at a feed point, remote from said terminated end, to said generator output so that said transmission line is a resonant output tank circuit of said radio-frequency generator, said continuous supply of dielectric materials passing between said ground electrode and said driven electrode; and b) metering the flow of said continuous supply of dielectric materials emerging from said transmission line.

11. The method as recited in claim 10, additionally comprising the step of forcing air through said continuous supply of dielectric materials as said dielectric materials pass through said transmission line.

12. The method as recited in claim 10, in which said continuous supply of dielectric materials has a temperature profile as it passes through said transmission line between said ground electrode and said driven electrode, and said method further comprises the steps of:
   a) measuring said temperature profile; and
   b) causing said radio-frequency generator to increase or decrease said electromagnetic power supplied therefrom so that said temperature profile is caused to be substantially within a desired temperature range.

13. The method as recited in claim 10, in which said ground electrode and said driven electrode are concentric, additionally comprising the step of constraining said continuous supply of dielectric materials passing through said transmission line between said ground electrode and said driven electrode to be within an annulus region remote from said driven electrode.

14. A method for heating a continuous supply of dielectric materials using electromagnetic power from a radio-frequency generator, said radio-frequency generator having a generator output, said method comprising the steps of:
   a) passing said continuous supply of dielectric materials through a terminated transmission line in a continuous flow, said transmission line having a driven end and a terminated end and said transmission line having a length, from said driven end to said terminated end, that is a quarter-wavelength of said wavelength of said electromagnetic power, said transmission line comprising:
      i. a ground electrode extending substantially from said driven end to said terminated end, said ground electrode being held at a constant electrical potential relative to said generator output; and
      ii. a driven electrode extending substantially from said driven end to said terminated end, said ground electrode and said driven electrode being concentric, said driven electrode being spaced an inter-electrode distance from said ground electrode, said driven electrode being held at said constant electrical potential at said terminated end of said transmission line and said driven electrode being directly coupled at a feed point, remote from said terminated end, to said generator output so that said transmission line is a resonant output tank circuit of said radio-frequency generator; and
   b) constraining said continuous supply of dielectric materials passing through said transmission line to be within an annulus region remote from said driven electrode and between said ground electrode and said driven electrode.

15. The method as recited in claim 14, in which said continuous supply of dielectric materials has a temperature profile as it passes through said transmission line within said annulus region, and said method further comprises the steps of:
   a) measuring said temperature profile; and
   b) causing said radio-frequency generator to increase or decrease said electromagnetic power supplied therefrom so that said temperature profile is caused to be substantially within a desired temperature range.

16. The method as recited in claim 15, additionally comprising the step of forcing air through said continuous supply of dielectric materials as said dielectric materials pass through said annulus region.

17. The method as recited in claim 16, additionally comprising the step of metering the flow of said continuous supply of dielectric materials emerging from said transmission line.

* * * * *